United States Patent
Gopinathapai et al.

(10) Patent No.: US 11,108,882 B2
(45) Date of Patent: Aug. 31, 2021

(54) SYSTEM FOR ASSESSING AND ENHANCING ROLE DEFINING PARAMETERS ASSOCIATED WITH ACCESS TO RESOURCES IN A NETWORK

(71) Applicant: BANK OF AMERICA CORPORATION, Charlotte, NC (US)

(72) Inventors: Rajesh Gopinathapai, Aurora, IL (US); Jennifer Greenwald, Chicago, IL (US); David Pritchard, London (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/707,853

(22) Filed: Dec. 9, 2019

(65) Prior Publication Data
US 2021/0176331 A1  Jun. 10, 2021

(51) Int. Cl.
H04L 29/08  (2006.01)

(52) U.S. Cl.
CPC ............ H04L 67/306 (2013.01); H04L 67/22 (2013.01)

(58) Field of Classification Search
CPC ....... H04L 67/306; H04L 67/22; H04L 63/20; H04L 43/00; H04L 29/08; H04L 63/067; G06F 9/44505; G06F 11/34; G06F 16/9535; G06F 9/468
See application file for complete search history.

(56) References Cited

U.S. PATENT DOCUMENTS

| | | | |
|---|---|---|---|
| 6,453,353 B1* | 9/2002 | Win | G06F 21/604 709/225 |
| 7,308,704 B2 | 12/2007 | Vogel et al. | |
| 7,451,477 B2 | 11/2008 | Griffin et al. | |
| 7,702,693 B1* | 4/2010 | Aiyagari | G06F 21/6218 707/785 |
| 7,716,734 B2* | 5/2010 | Birrell | G06F 21/6218 726/19 |
| 8,073,724 B2* | 12/2011 | Harthcryde | G06Q 10/063118 705/7.14 |
| 8,132,231 B2 | 3/2012 | Amies et al. | |
| 8,196,184 B2 | 6/2012 | Amirov et al. | |
| 8,473,318 B2 | 6/2013 | Nielson et al. | |

(Continued)

OTHER PUBLICATIONS

Menegaz, Gery. "Enterprise Entitlements Management: Moving beyond authentication." Between the Lines, Jun. 7, 2012, https://www.zdnet.com/article/enterprise-entitlements-management-moving-beyond-authentication/.

*Primary Examiner* — Sargon N Nano
(74) *Attorney, Agent, or Firm* — Michael A. Springs; Moore & Van Allen PLLC; Nicholas C. Russell

(57) ABSTRACT

Embodiments of the present invention provide a system for assessing role defining parameters associated with access to resources in a network. The system is configured for extracting information associated with one or more resources, one or more users, and one or more authorizations, determining one or more metrics associated with one or more roles within an entity based on the extracted information, calculating a role defining parameter that defines a condition of the one or more roles based on the one or more metrics associated with the one or more roles, wherein the role defining parameter is associated with access to the one or more resources, determining if the parameter is below a predefined threshold, and performing one or more actions.

15 Claims, 6 Drawing Sheets

(56) References Cited

U.S. PATENT DOCUMENTS

| | | | |
|---|---|---|---|
| 8,863,276 B2 * | 10/2014 | Giblin | G06F 11/3438 |
| | | | 726/21 |
| 9,087,148 B2 * | 7/2015 | Giblin | H04L 63/20 |
| 9,280,646 B1 * | 3/2016 | Nandyalam | G06F 21/6218 |
| 9,407,664 B1 | 8/2016 | Banerjee | |
| 9,471,797 B1 * | 10/2016 | Biller | G06F 21/604 |
| 9,536,070 B2 | 1/2017 | Kling et al. | |
| 9,542,433 B2 * | 1/2017 | Moloian | G06F 16/215 |
| 9,558,334 B2 | 1/2017 | Kling et al. | |
| 9,591,008 B2 * | 3/2017 | Shulman | H04L 63/0281 |
| 9,602,517 B2 | 3/2017 | Connor et al. | |
| 9,684,793 B2 | 6/2017 | Schlesinger et al. | |
| 9,684,901 B2 | 6/2017 | Stuart et al. | |
| 10,521,325 B2 * | 12/2019 | Pan | H04L 41/0843 |
| 10,862,928 B1 * | 12/2020 | Badawy | H04L 63/104 |
| 10,938,828 B1 * | 3/2021 | Badawy | G06F 21/6218 |
| 2007/0198317 A1 * | 8/2007 | Harthcryde | G06Q 10/00 |
| | | | 705/7.14 |
| 2008/0215622 A1 * | 9/2008 | Jordan | G06F 16/217 |
| 2008/0288330 A1 | 11/2008 | Hildebrand et al. | |
| 2012/0131683 A1 * | 5/2012 | Nassar | H04L 63/08 |
| | | | 726/28 |
| 2014/0215604 A1 * | 7/2014 | Giblin | G06F 11/328 |
| | | | 726/21 |
| 2015/0074014 A1 * | 3/2015 | Radkowski | G06Q 10/0631 |
| | | | 705/342 |
| 2016/0335260 A1 * | 11/2016 | Convertino | G06F 16/2358 |
| 2018/0322456 A1 * | 11/2018 | Vesely | G06Q 10/10 |
| 2019/0079751 A1 * | 3/2019 | Foskett | G06F 9/5072 |
| 2019/0327271 A1 * | 10/2019 | Saxena | G06N 3/0454 |
| 2019/0340554 A1 * | 11/2019 | Dotan-Cohen | |
| | | | G06Q 10/063112 |

\* cited by examiner

SYSTEM FOR ASSESSING AND ENHANCING ROLE DEFINING PARAMETERS ASSOCIATED WITH ACCESS TO RESOURCES IN A NETWORK

BACKGROUND

Conventional systems do not have the capability to assess role defining parameters associated with access to resources in a network. As such, there exists a need for a system to assess and enhance role defining parameters associated with access to resources in a network.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for assessing and enhancing role defining parameters associated with access to resources in a network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts information associated with one or more resources, one or more users, and one or more authorizations, determines one or more metrics associated with one or more roles within an entity based on the extracted information, calculates a role defining parameter that defines a condition of the one or more roles based on the one or more metrics associated with the one or more roles, wherein the role defining parameter is associated with access to the one or more resources, and in response to calculating the role defining parameter, determines if the parameter is below a predefined threshold.

In some embodiments, the present invention determines that the role defining parameter is below the predefined threshold and in response to determining that the role defining parameter is below the predefined threshold, performs one or more actions to enhance the role defining parameter.

In some embodiments, the present invention receives the one or more actions from at least one user.

In some embodiments, the present invention determines that the role defining parameter is below the predefined threshold and displays the role defining parameter and the one or more metrics on a graphical user interface of a user device associated with the at least one user.

In some embodiments, the present invention displays the role defining parameter and the one or more metrics by generating one or more graphs to represent the one or more metrics and the role defining parameter and displaying the one or more graphs on the graphical user interface.

In some embodiments, the present invention identifies real-time changes associated with the one or more resources, the one or more users, and the one or more authorizations, updates the one or more metrics associated with the one or more roles, and re-calculates the role defining parameter associated with the one or more roles.

In some embodiments, the one or more metrics comprise at least one of role impact, similarity, and role drift.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
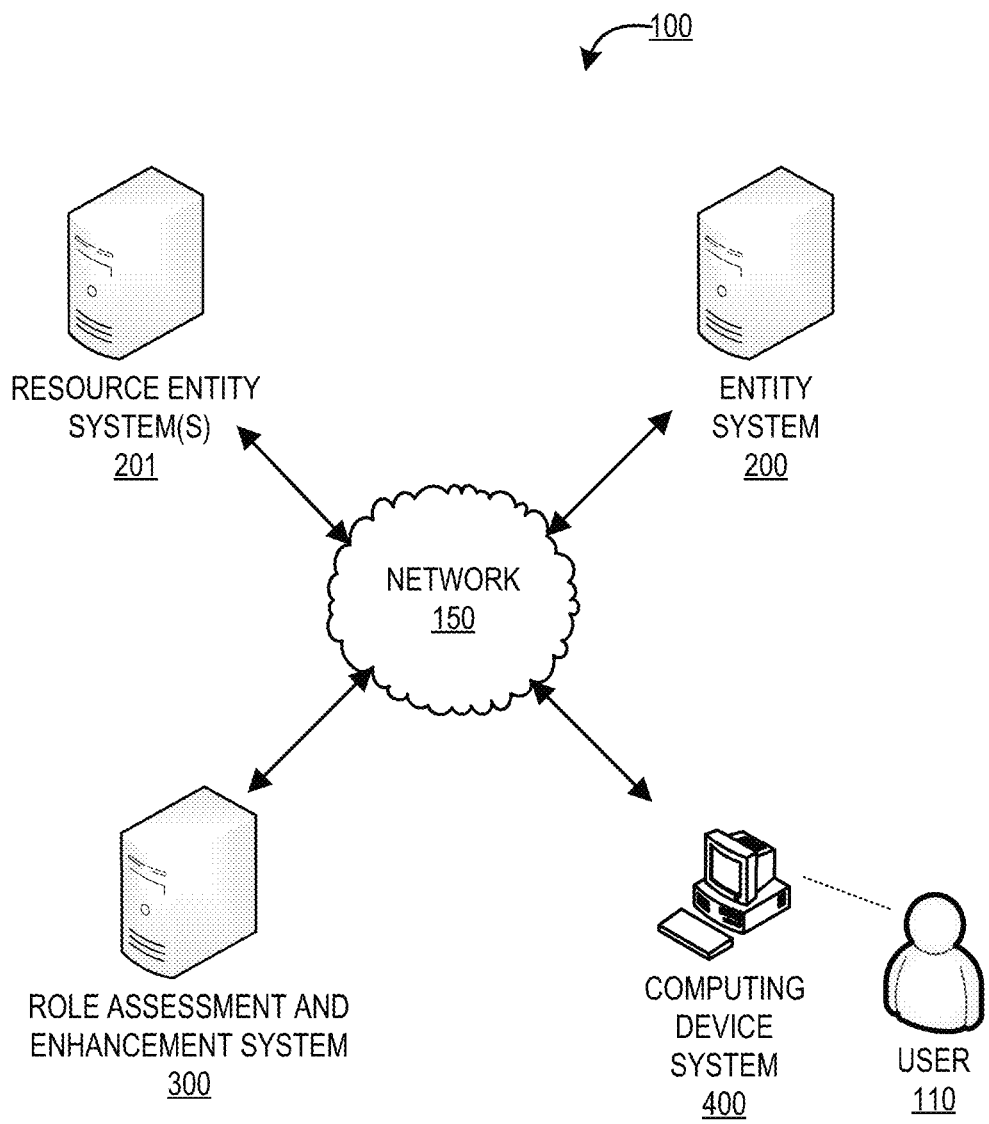
Figure 2:
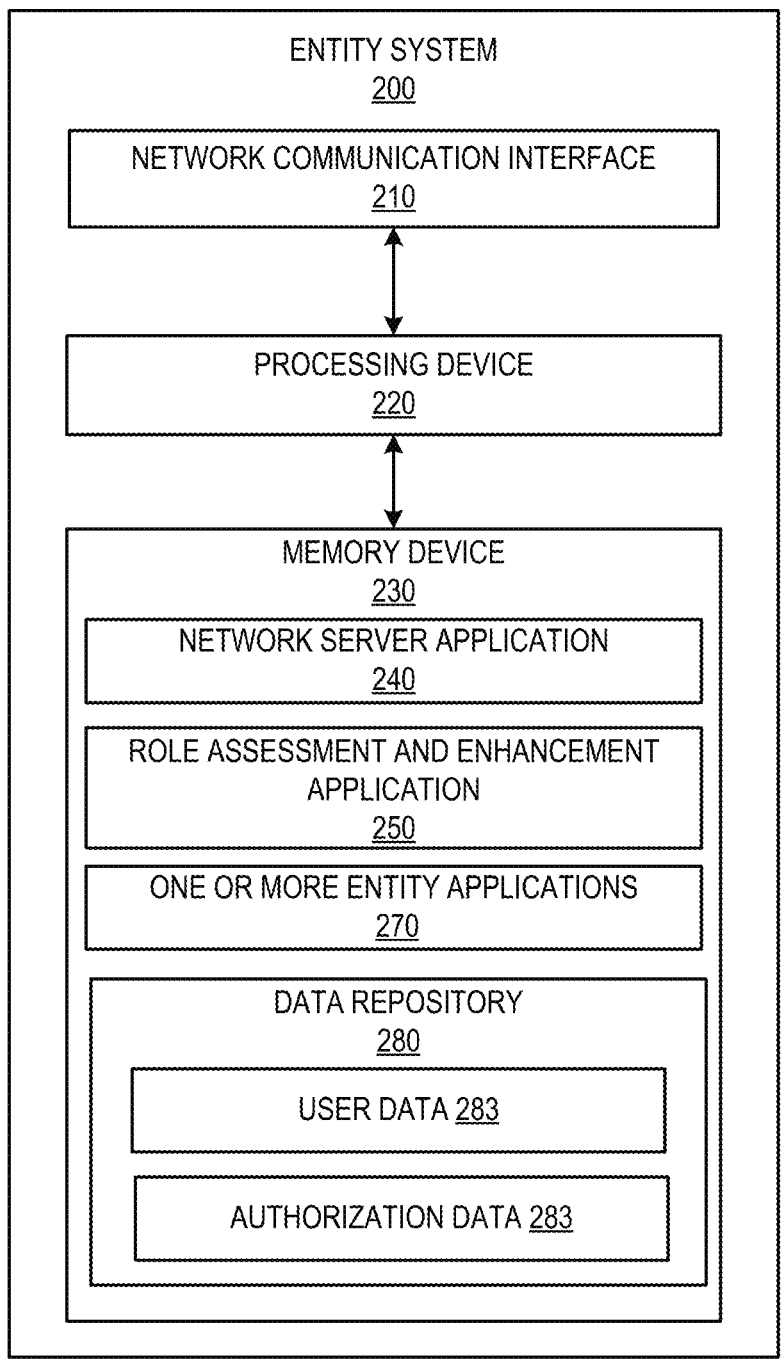
Figure 3:
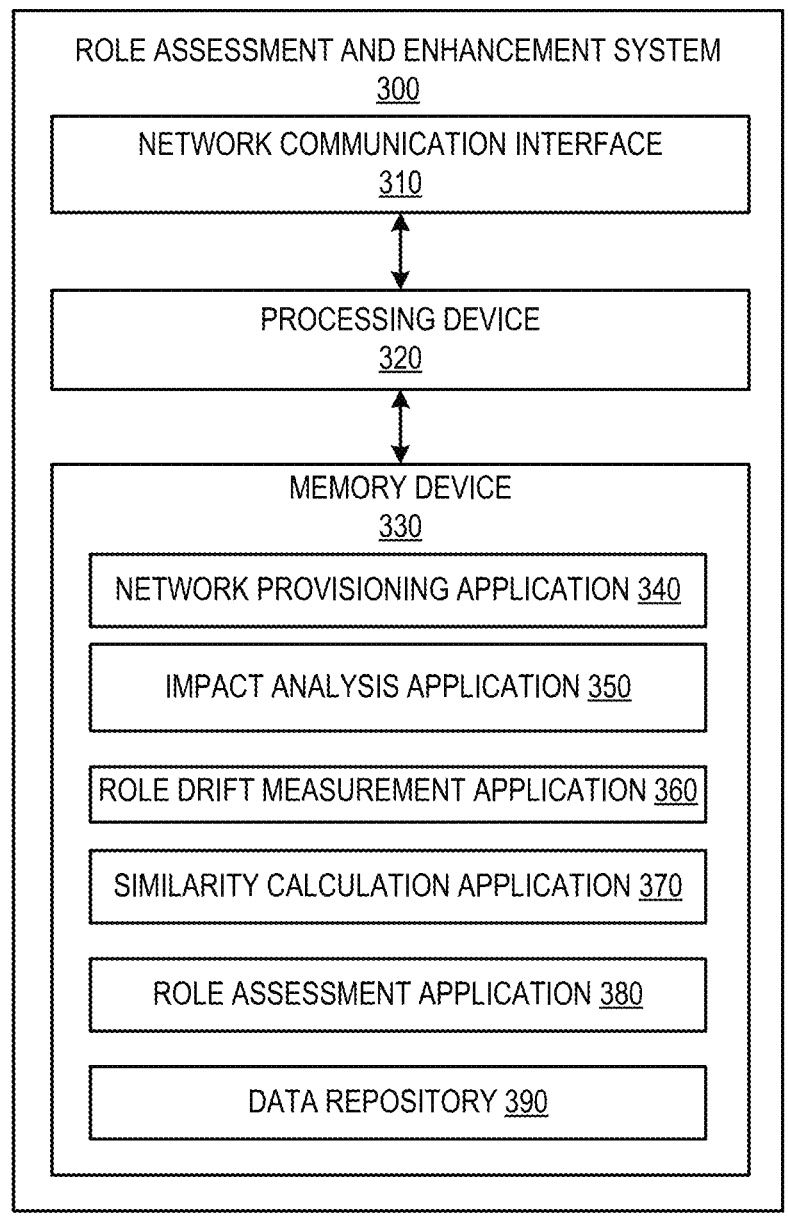
Figure 4:
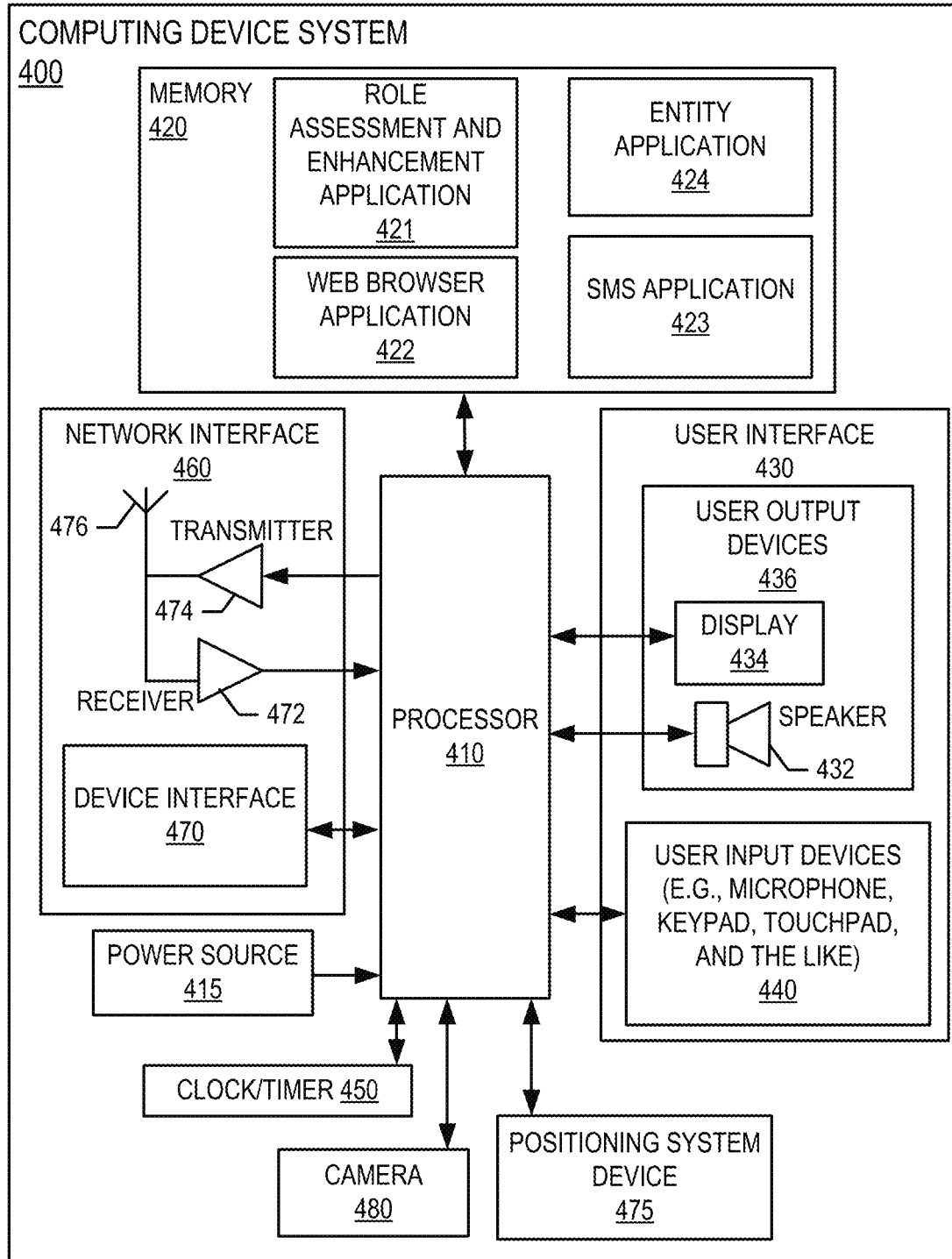
Figure 5:
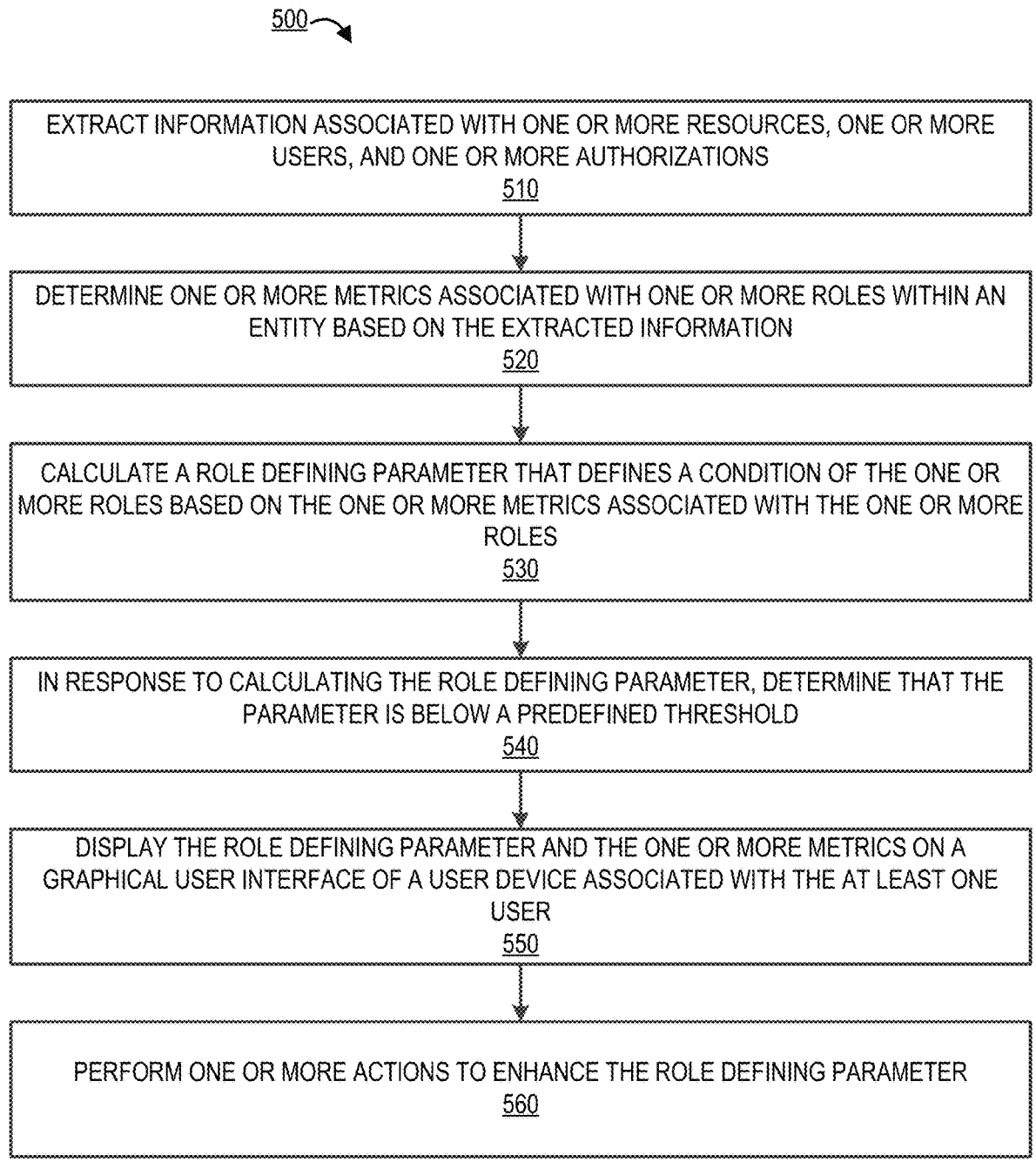
Figure 6A:
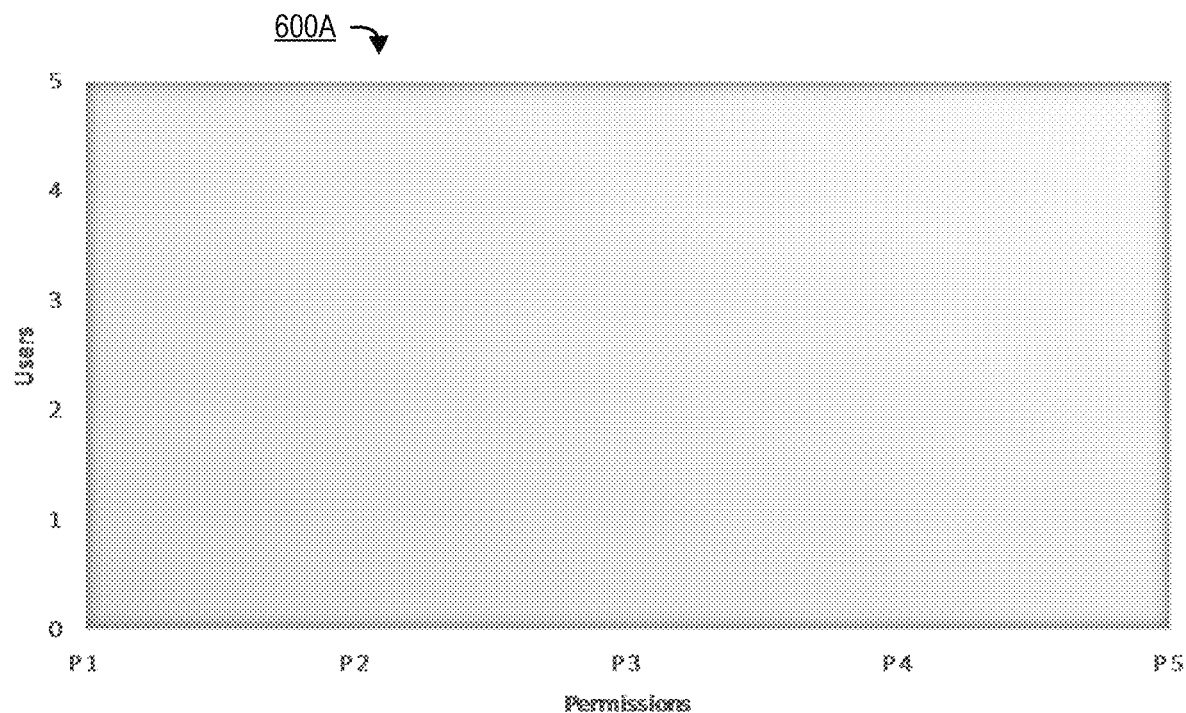
Figure 6B:
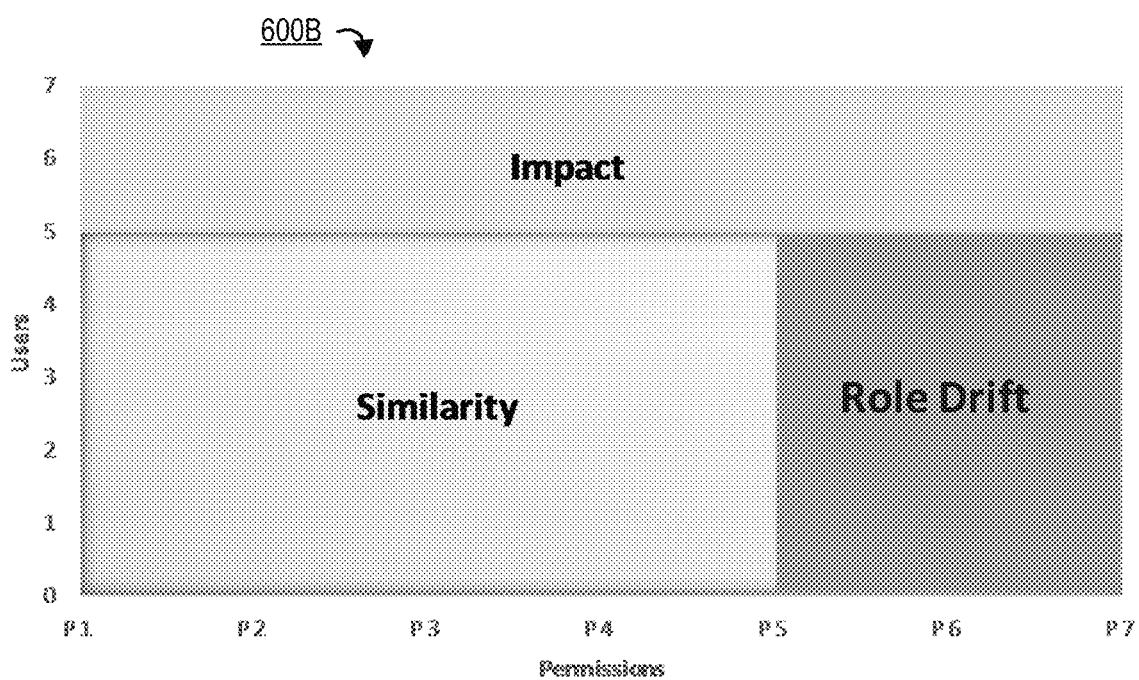

Having thus described embodiments of the invention in general terms, reference will now be made the accompanying drawings, wherein:

FIG. 1 provides a block diagram illustrating a system environment for assessing and enhancing role defining parameters associated with access to resources in a network, in accordance with an embodiment of the invention;

FIG. 2 provides a block diagram illustrating the entity system 200 of FIG. 1, in accordance with an embodiment of the invention;

FIG. 3 provides a block diagram illustrating a role assessment and enhancement system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for assessing and enhancing role defining parameters associated with access to resources in a network, in accordance with an embodiment of the invention; and FIGS. 6A and 6B provide a graphical representation illustrating one or more metrics associated with one or more roles, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, insurance companies and the like. In some embodiments, the "entity" may include a non-financial transaction. Furthermore, embodiments of the present invention use the term "user." It will be appreciated by someone with ordinary skill in the art that the user may be an employee of the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

As described herein, the term "resources" may be electronic resources and/or software sources. Electronic resources may be one or more resource entity systems such as computing systems, communications systems, or the like provided by the entity. Software resources may include any applications, databases, and/or other resources provided by the entity. As used herein, the term "authorization" may be a permission associated with accessing the resources. As used herein, the term "role" may be a title that defines responsibilities of one or more users of an entity.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, one or more users within an entity are assigned a role and each role within an entity has specific authorizations to access resources of an entity. Conventional systems do not provide a platform to control the roles and measure the how well the roles are controlled, because of which a user has to manually assign authorizations or permissions to each user within an entity, thereby making it difficult to manage and/or control roles. Such a process is time consuming and is highly inefficient. Therefore, there exists a need for a system to provide a platform that enables a user to better manage and/or control roles associated with the entity. The system of the present invention provides a platform that allows a user to manage and/or control roles associated with the entity and in some embodiments, the system automatically manages and/or controls the roles associated with the entity. Additionally, the system also enables the tracking of role defining parameters (i.e., wellness) associated with a role which allows the entity to show the regulating agencies that each of the users associated with a role have appropriate authorizations.

FIG. 1 provides a block diagram illustrating a system environment 100 for assessing and enhancing role defining parameters associated with access to resources in a network, in accordance with an embodiment of the invention. As illustrated in FIG. 1, the environment 100 includes a role assessment and enhancement system 300, entity system 200, a computing device system 400, and one or more resource entity systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. The employees of the entity may be associated with one or more roles, where each employee associated with a role is responsible for performing certain tasks within the entity.

The entity system(s) 200 may be any system owned or otherwise controlled by an entity to support or perform one or more process steps described herein. In some embodiments, the managing entity is a financial institution. In some embodiments, the managing entity is a non-financial institution. In some embodiments, the one or more resource entity systems 201 may be any electronic systems. In some embodiments, the one or more resource entity system 201 may be any electronic devices that facilitate user interactions.

The role assessment and enhancement system 300 is a system of the present invention for performing one or more process steps described herein. In some embodiments, the role assessment and enhancement system 300 may be an independent system. In some embodiments, the role assessment and enhancement system 300 may be a part of the entity system 200.

The role assessment and enhancement system 300, the entity system 200, the computing device system 400, and/or the one or more resource entity systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the network 150 may be an internal private network associated with the entity. In general, the role assessment and enhancement system 300 is configured to extract information and/or communicate information or instructions with the entity system 200, the computing device system 400, and/or the one or more resource entity systems 201 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the role assessment and enhancement system 300, entity system 200, and/or the one or more resource entity systems 201 across the network 150. The computing device system 400 may be used by the user 100 to access software resources (e.g., applications, databases, or the like associated with the entity).

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a role assessment and enhancement application 250, one or more entity applications 270, and a data repository 280 comprising user data 283 and authorization data 285, and resource data (not shown). The computer-executable program code of the network server application 240, the role assessment and enhancement application 250, and the one or more entity application 270, to perform certain logic, data-extraction, and data-storing functions of the entity system 200 described herein, as well as communication functions of the entity system 200.

The network server application 240, the role assessment and enhancement application 250 and the one or more entity application 270 are configured to store data in the data repository 280 or to use the data stored in the data repository 280 when communicating through the network communication interface 210 with the role assessment and enhancement system 300, the computing device system 400, and/or the one or more resource entity systems 201 to perform one or more process steps described herein. In some embodiments, the entity system 200 may receive instructions from the role assessment and enhancement system 300 via the role assessment and enhancement application 250 to perform certain operations. The role assessment and enhancement application 250 may be provided by the role assessment and enhancement system 300. The one or more entity applications 270 may be software resources used, created, modified, and/or managed by the entity system 200.

FIG. 3 provides a block diagram illustrating the role assessment and enhancement system 300 in greater detail, in accordance with embodiments of the invention. As illustrated in FIG. 3, in one embodiment of the invention, the role assessment and enhancement system 300 includes one or more processing devices 320 operatively coupled to a network communication interface 310 and a memory device 330. In certain embodiments, the role assessment and enhancement system 300 is operated by an entity, such as a financial institution, while in other embodiments, the role assessment and enhancement system 300 is operated by an entity other than a financial institution. In some embodiments, the role assessment and enhancement system 300 is owned or operated by the entity of the entity system 200. In some embodiments, the role assessment and enhancement system 300 may be an independent system. In alternate embodiments, the role assessment and enhancement system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the role assessment and enhancement system 300 described herein. For example, in one embodiment of the role assessment and enhancement system 300, the memory device 330 includes, but is not limited to, a network provisioning application 340, an impact analysis application 350, a role drift measurement application 360, a similarity calculation application 370, a role assessment application 380, and a data repository 390 comprising data processed or accessed by one or more applications in the memory device 330. The computer-executable program code of the network provisioning application 340, the impact analysis application 350, the role drift measurement application 360, the similarity calculation application 370, and the role assessment application 380, may instruct the processing device 320 to perform certain logic, data-processing, and data-storing functions of the role assessment and enhancement system 300 described herein, as well as communication functions of the role assessment and enhancement system 300.

The network provisioning application 340, the impact analysis application 350, the role drift measurement application 360, the similarity calculation application 370, and the role assessment application 380 are configured to store the processed data in the data repository 390. The network provisioning application 340, the impact analysis application 350, the role drift measurement application 360, the similarity calculation application 370, and the role assessment application 380 are configured to invoke or use the data in the data repository 390 when communicating through the network communication interface 310 with the entity system 200, the computing device system 400, and/or the one or more resource entity systems 201. In some embodiments, the network provisioning application 340, the impact analysis application 350, the role drift measurement application 360, the similarity calculation application 370, and the role assessment application 380 may store the data extracted or received from the entity system 200, the third party system 201, and the computing device system 400 in the data repository 390. In some embodiments, the impact analysis application 350, the role drift measurement application 360, the similarity calculation application 370, and the role assessment application 380 may be a part of a single application. The functions of the impact analysis application 350, the role drift measurement application 360, the similarity calculation application 370, and the role assessment application 380 are explained in detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a role assessment and enhancement application 421, and an entity application 424. These applications also typically comprise instructions to a graphical user interface (GUI) on the display 430 that allows the user 110 to interact with the entity system 200, the role assessment and enhancement system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the role assessment and enhancement application 421 provided by the role assessment and enhancement system 300 allows the user 110 to access the role assessment and enhancement system 300. In some embodiments, the entity application 424 provided by the entity system 200 and the role assessment and enhancement application 421 provided by the role assessment and enhancement system 300 allow the user 110 to access the functionalities provided by the role assessment and enhancement system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for assessing and enhancing role defining parameters associated with access to resources in a network, in accordance with an embodiment of the invention.

As shown in block 510, the system extracts information associated with one or more resources, one or more users, and one or more authorizations. In some embodiments, the one or more resources may be software resources, including, but not limited to, applications, databases, cloud servers, or the like. In some embodiments, the one or more resources may be electronic resources, including, but not limited to, computing systems, fax systems, telephones, automated machines, or the like. The one or more users may be employees of the entity that are associated with one or more roles. In some embodiments, the one or more users may be associated with a single role. In some embodiments, the one or more users may be associated with more than one role. The one or more users may use the one or more resources to fulfill the requirements associated with the one or more roles. Each user associated with the one or more roles may require one or more authorizations to access the one or more resources. For example, a user associated with an application testing role may need permissions to access databases associated with the application, a testing application, or the like.

As shown in block 520, the system determines one or more metrics associated with one or more roles within an entity based on the extracted information. In some embodiments, the system extracts the information by crawling into one or more resources, the one or more entity systems, and the one or more resource entity systems. In some embodiments, the system extracts the information from the data repository of the entity system. The one or more metrics describe the effectiveness of the one or more roles. The one or more metrics comprise role impact, similarity, and role drift. The role impact may be defined as the number of entitlements impacted as users are added or deleted from a particular role. For example, if a user is removed from a role, the impact could be a positive value. In another example, if a new user is added to a role, the impact could be a negative value. Similarity may be defined as the similarity between entitlements associated with users in a particular role. For example, if a first role has five users and ten permissions, and each user has all ten permissions, the similarity of each user associated with the role is 100 percent. In another example, if a first role has two users and hundred permissions and a first user of the two users has all hundred permissions and the second user has seventy permissions, the similarity of the first user is 100 percent and the similarity of the second user is seventy percent. Role drift may be defined as the number of permissions and/or entitlements that are added or removed from a particular role with change in time. The one or more metrics associated with a role are illustrated in FIG. 6A and FIG. 6B.

FIG. 6A provides a graphical representation illustrating one or more metrics associated with one or more roles at a first time period, in accordance with an embodiment of the invention. As shown, in the first time period, five users may be associated with a first role and the first role may have 5 permissions. The overall wellness associated with the first role in such a case is 100 percent, as all the users associated with the first role have all five permissions.

FIG. 6B provides a graphical representation illustrating one or more metrics associated with one or more roles at a second time period, in accordance with an embodiment of the invention. As illustrated, in the second time period, two new users and two new permissions are added to the first role. As such, the impact associated with the first role changes when two new users are added to the first role and the first role drifts as two new permissions are added to the first role. As a result of these changes, the overall wellness associated with the first role changes.

As shown in block 530, the system calculates a role defining parameter that defines a condition (wellness) of the one or more roles based on the one or more metrics associated with the one or more roles. The role defining parameter may be defined as a wellness score of a role. The role defining parameter is associated with permissions of the role to access the resources within an entity. The role defining parameter is the average of similarity across a role. Continuing with the previous example, where a first role has two users and hundred permissions and similarity of the first user is hundred percent and the similarity of the second user is seventy percent. The overall wellness associated with the first role in such a case is eighty five percent.

As shown in block 540, the system in response to calculating the role defining parameter, determines that the role defining parameter is below a predefined threshold. In some embodiments, the system may generate and transmit an alert to the at least one user based on determining that the role defining parameter is below the predefined threshold. The at least one user may be a role engineer responsible for maintaining and monitoring one or more roles and one or more authorizations. As shown in block 550, the system displays the role defining parameter and the one or more metrics on a graphical user interface of a user device associated with the at least one user. In some embodiments, the system may generate tables to illustrate the one or more metrics and the role defining parameter. In some embodiments, the system may generate graphs as shown in FIGS. 6A and 6B to illustrate the one or more metrics and the role defining parameter. The system may display the one or more metrics and the role defining parameter on a dashboard or a platform associated with the system.

As shown in block 560, the system performs one or more actions to enhance the role defining parameter. In some embodiments, the one or more actions are provided by the at least one user. In response to receiving the notification associated with lower value of the role defining parameters, the system may provide one or more actions to the system. For example, the user may identify that the overall wellness of a first role is thirty percent and may perform actions to remove one or more users from a role, grant permissions to one or more users associated with the role, or the like. The system may provide a single button on the dashboard that allows a role engineer to efficiently grant permissions. For example, the system may identify that a set of users associated with a first role do not have a first permission and may generate a functionality that allows the role engineer to provide the first permission to the set of users, thereby improving the overall wellness of the first role. In another example, the system may identify that a new user is added to the first role and automatically generates a single click functionality that allows the role engineer to provide permissions associated with the first role to the new user. In another example, the system may identify that a user associated with a first role was terminated and automatically generates a single click functionality that allows the role engineer to remove permissions and/or decommission electronic resources associated with the terminated user. In another example, the system may identify that a user associated with a first role does not have any permissions and is not authorized to have the permissions associated with the first role and may automatically generate a single click functionality that will assign the user to a second role. The system modifies the dashboard with the dynamically generated functionality. In some embodiments, the system may automatically perform the one or more actions. In some embodiments, the system performs the one or more actions based on an input from the at least one user (e.g., role engineer).

The system monitors the one or more authorizations, the one or more roles, and the one or more resources to identify real-time changes and updates the one or more metrics and the role defining parameter. In response to identifying the real-time changes, the system automatically repeats the process described in FIG. 5 to maintain the role defining parameter above the predefined value.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for assessing and enhancing role defining parameters associated with access to resources in a network, the system comprising:
at least one network communication interface;
at least one non-transitory storage device; and
at least one processing device coupled to the at least one non-transitory storage device and the at least one network communication interface, wherein the at least one processing device is configured to:
extract information associated with one or more resources, one or more users, and one or more authorizations;
determine one or more metrics associated with one or more roles within an entity based on the extracted information, wherein the one or more metrics comprise at least role impact, similarity, and role drift;
calculate a role defining parameter that defines a condition of the one or more roles based on the one or more metrics associated with the one or more roles, wherein the role defining parameter is associated with access to the one or more resources;
in response to calculating the role defining parameter, determine that the parameter is below a predefined threshold;
in response to determining that the role defining parameter is below the predefined threshold, identify one or more actions to enhance the role defining parameter;
automatically generate a single click functionality for performing the one or more actions;
display the single click functionality on a dashboard;
receive a single click input associated with the single click functionality from at least one user; and
in response to receiving the single click input, perform the one or more actions.

2. The system of claim 1, wherein the at least one processing device is configured to receive the one or more actions from the at least one user.

3. The system of claim 1, wherein the at least one processing device is further configured to determine that the role defining parameter is below the predefined threshold and display the role defining parameter and the one or more metrics on a graphical user interface of a user device associated with at least one user.

4. The system of claim 3, wherein displaying the role defining parameter and the one or more metrics comprises generating one or more graphs to represent the one or more metrics and the role defining parameter and displaying the one or more graphs on the graphical user interface.

5. The system of claim 1, wherein the at least one processing device is further configured to:
identify real-time changes associated with the one or more resources, the one or more users, and the one or more authorizations;
update the one or more metrics associated with the one or more roles; and
re-calculate the role defining parameter associated with the one or more roles.

6. A computer program product for assessing and enhancing role defining parameters associated with access to resources in a network, the computer program product comprising a non-transitory computer-readable storage medium having computer executable instructions for causing a computer processor to perform the steps of:
extracting information associated with one or more resources, one or more users, and one or more authorizations;
determining one or more metrics associated with one or more roles within an entity based on the extracted information, wherein the one or more metrics comprise at least role impact, similarity, and role drift;
calculating a role defining parameter that defines a condition of the one or more roles based on the one or more metrics associated with the one or more roles, wherein the role defining parameter is associated with access to the one or more resources;
in response to calculating the role defining parameter, determining that the parameter is below a predefined threshold;
in response to determining that the role defining parameter is below the predefined threshold, identifying one or more actions to enhance the role defining parameter;
automatically generating a single click functionality for performing the one or more actions;
displaying the single click functionality on a dashboard;
receiving a single click input associated with the single click functionality from at least one user; and
in response to receiving the single click input, performing the one or more actions.

7. The computer program product of claim 6, wherein the computer executable instructions cause the computer processor to receive the one or more actions from the at least one user.

8. The computer program product of claim 6, wherein the computer executable instructions cause the computer processor to determine that the role defining parameter is below the predefined threshold and display the role defining parameter and the one or more metrics on a graphical user interface of a user device associated with at least one user.

9. The computer program product of claim 8, wherein displaying the role defining parameter and the one or more metrics comprises generating one or more graphs to represent the one or more metrics and the role defining parameter and displaying the one or more graphs on the graphical user interface.

10. The computer program product of claim 6, wherein the computer executable instructions cause the computer processor to:
identify real-time changes associated with the one or more resources, the one or more users, and the one or more authorizations;
update the one or more metrics associated with the one or more roles; and
re-calculate the role defining parameter associated with the one or more roles.

11. A computer implemented method for assessing and enhancing role defining parameters associated with access to resources in a network, the method comprising:
extracting information associated with one or more resources, one or more users, and one or more authorizations;
determining one or more metrics associated with one or more roles within an entity based on the extracted information, wherein the one or more metrics comprise at least role impact, similarity, and role drift;
calculating a role defining parameter that defines a condition of the one or more roles based on the one or more metrics associated with the one or more roles, wherein the role defining parameter is associated with access to the one or more resources;

in response to calculating the role defining parameter, determining that the parameter is below a predefined threshold;

in response to determining that the role defining parameter is below the predefined threshold, identifying one or more actions to enhance the role defining parameter;

automatically generating a single click functionality for performing the one or more actions;

displaying the single click functionality on a dashboard;

receiving a single click input associated with the single click functionality from at least one user; and in response to receiving the single click input, performing the one or more actions.

12. The computer implemented method of claim 11, wherein the method further comprises receiving the one or more actions from the at least one user.

13. The computer implemented method of claim 11, wherein the method further comprises:

determining that the role defining parameter is below the predefined threshold and display the role defining parameter and the one or more metrics on a graphical user interface of a user device associated with at least one user.

14. The computer implemented method of claim 13, wherein displaying the role defining parameter and the one or more metrics comprises generating one or more graphs to represent the one or more metrics and the role defining parameter and displaying the one or more graphs on the graphical user interface.

15. The computer implemented method of claim 11, wherein the method further comprises:

identifying real-time changes associated with the one or more resources, the one or more users, and the one or more authorizations;

updating the one or more metrics associated with the one or more roles; and re-calculating the role defining parameter associated with the one or more roles.

* * * * *